(12) United States Patent
Satonaka et al.

(10) Patent No.: US 6,236,749 B1
(45) Date of Patent: May 22, 2001

(54) IMAGE RECOGNITION METHOD (75) Inventors: Takami Satonaka, Osaka (JP); Takaaki Baba, Los Altos; Koji Asari, Palo Alto, both of CA (US)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/147,592

(22) PCT Filed: Mar. 23, 1998

(86) PCT No.: PCT/US98/05443

§ 371 Date: Jan. 29, 1999

§ 102(e) Date: Jan. 29, 1999

(87) PCT Pub. No.: WO99/49414

PCT Pub. Date: Sep. 30, 1999

(51) Int. Cl.[7] .................................................... G06K 9/00
(52) U.S. Cl. ........................ 382/154; 382/156; 382/168; 382/190; 382/250; 382/285
(58) Field of Search .................................... 382/156, 154, 382/159, 160, 165, 170, 168, 173, 172, 181, 253, 274, 276, 285, 254, 250

(56) References Cited

U.S. PATENT DOCUMENTS

| 5,150,433 | * | 9/1992 | Daly | 382/18 |
|---|---|---|---|---|
| 5,274,714 | * | 12/1993 | Hutcheson et al. | 382/16 |
| 5,568,568 | * | 10/1996 | Takizawa et al. | 382/220 |
| 5,703,965 | * | 12/1997 | Fu et al. | 382/232 |
| 5,774,112 | * | 6/1998 | Kasson | 345/147 |
| 5,852,669 | | 12/1998 | Elefteridious | 382/251 |
| 6,031,937 | * | 2/2000 | Graffagnino | 382/232 |

* cited by examiner

Primary Examiner—Matthew C. Bella
Assistant Examiner—Sheela Chawan
(74) Attorney, Agent, or Firm—McDermott, Will & Emery (57) ABSTRACT

The method provides object recognition procedure and a neural network by using the discrete-cosine transform (DCT) (4) and histogram adaptive quantization (5). The method employs the DCT transform with the added advantage of having a computationally-efficient and data-independent matrix as an alternative to the Karhunen-Loeve transform or principal component analysis which requires data-independent eigenvectors as a priori information. Since the set of learning samples (1) may be small, we employ a mixture model of prior distributions for accurate estimation of local distribution of feature patterns obtained from several two dimensional images. The model selection method based on the mixture classes is presented to optimize the mixture number and local metric parameters. This method also provides image synthesis to generate a set of image databases to be used for training a neural network.

9 Claims, 6 Drawing Sheets

|  | ERROR RATE[%] | RECOGNITION TIME | TRAINING TIME |
|---|---|---|---|
| THIS PATENT | 2.29% | 0.1SEC | 2.95MIN |
| SOM+CN | 3.8% | 0.5SEC | 4HOURS |
| PSEUDO2D HMM | 5% | 240SEC | N/A |
| EIGENFACES | 10% | N/A | N/A |

FIG. 13

IMAGE RECOGNITION METHOD

FIELD OF THE INVENTION

The present invention relates to an image recognition method for recognizing an object in a three-dimensional space based on the feature patterns of a two-dimensional image.

BACKGROUND OF THE INVENTION

In the methods for recognizing an object in a three-dimensional space known before the present invention, feature patterns representing the attributes of the object by using chromatic signals or luminance ones are extracted from several two-dimensional images. The object having such attributes is recognized by using the feature patterns thus extracted.

Specifically, an image region including the object is cut out from the two-dimensional image, and the image region is divided into several rectangular elements. Then, the average values of the pixels which are included in the rectangular elements are used as the feature patterns identifying the object. Thus, since the dimension of the feature patterns becomes very high, it has been required to reduce the dimension of the feature patterns.

In order to efficiently represent such high-dimensional feature patterns in a low-dimensional feature pattern space, various orthogonal transformation techniques such as principal component analysis and Karhunen-Loeve transform have been employed. The previous method (reported in Face Recognition: Hybrid Neural, Network Approach Technical Reports, CS-TR-3608, University of Maryland, 1996) proposed a neural network, in which feature pattern are extracted by principal component analysis. Such a method provides us a base suitable for representing higher-dimensional feature patterns in a lower-dimensional space.

In order to identify the type of an arbitrary object by using the feature patterns represented in such a lower-dimensional space, a neural network has been used. In the neural network, neuron units recognize the feature patterns by using decision function based on weighted summation calculation, convolution calculation or distance calculation.

A multi-layered neural network consisting of neural recognition units performing weighted summation calculations includes: terminals provided for an input or an output layer to which the feature patterns are input or output and an intermediate layer. The dimension of terminals in the input layer is the same as that of a feature pattern input thereto, and the number of the neuron units in the output layer is the same as the number of objects having different attributes. When a feature pattern is input to input terminals, neuron units in the output layer output the likelihood of the feature pattern belonging to each class. The type of the object to which the feature pattern belongs is determined by a neuron unit in the output layer which has the maximum likelihood output. The connection coefficients between these layers are modified by a learning technique such that a neuron unit to classify a feature pattern outputs the maximum likelihood output. The learning coefficients of the network are modified supervisedly by the error back propagation method in which a set of input patterns and expected output patterns are presented to input terminals and output terminals of neural network as teaching signals. For the neural unit having a sigmoid function, teaching signal 0 or 1 is presented to each neuron output.

Kohonen proposed a single layered network based on distance calculations, which stores reference feature patterns representing the attribute of an object. The network determines Euclidien distance between an arbitrary feature pattern and a reference feature pattern. T. ( Kohonen, The self-organizing map, *Proc. of the IEEE* 78, 1464–1480, 1990.) To improve the performance further, Mahalanobis distance considering statistical distribution of input feature patterns is introduced as a metric measure to determine the likelihood of a feature pattern belonging to an object class.

In an image recognition method utilizing an image communication technique, an image, which has been compressed by using MPEG or JPEG standard is transmitted, received and then decompressed. After the image has been decompressed, a feature extraction is performed, thereby determining the features of the image.

The problems of the previous methods for recognizing an object in a three-dimensional space by using the image of the object will be described.

First, in the image of an object in a three-dimensional space, the object has a high degree of freedom. Specifically, the recognition precision is dependent on the rotation and the position of the object and a variation in illumination surrounding the object.

In addition, if the three-dimensional object is to be represented by using several two-dimensional images, at least a memory having a large capacity is required. Moreover, in the principal component analysis and the orthogonal transformation which are used for reducing the amount of information, the base representing the features of an object to be recognized is dependent on the distribution of data. Furthermore, it is required to perform an enormous amount of calculation to obtain the data-dependent base. Thus, in a conventional multi-layered neural network, the network structure thereof is too complicated and the time required for learning is too long. For example, in the method by Lawrence et al., it takes a learning time of about 4 hours to make the network learn half of the data stored in the database in which 10 distinct facial features are stored for each of 40 persons. Thus, the problem is to make a complicated network efficiently classify an enormous amount of data by using a smaller number of learning image samples.

Furthermore, the statistical distribution of feature patterns of an object deviates significantly from a normal distribution when available training samples of an image database are relatively small. It is particularly difficult to estimate variance of the statistical distribution when the number of training samples is small. The error rate of an object recognition considering the variances sometimes is higher than that of an object recognition neglecting it due to failure to estimate variances precisely.

SUMMARY OF THE INVENTION

In order to solve the problems described above, the present invention provides the following image recognition methods.

The first means is quantization of luminance or chromatic signals. The luminance or chromatic signals of all the pixels of the two-dimensional image, which have been obtained by scanning an object in a three-dimensional space, are input into a nonlinear table and are transformed into quantified ones. The nonlinear table is configured by using the integral histogram distribution of the luminance or chromatic signals, which has been obtained from all the pixels of the two-dimensional image of an object having an attribute, such that, in a histogram distribution of scales which has been obtained by quantizing the input image signals of all the pixels of the two-dimensional image, the histogram of the quantified pixels belonging to each of the scales is equalized.

The second means is a feature pattern extraction using a rectangular element as a basic element. The two-dimensional image, obtained by the first means, is divided into several rectangular elements, and the number of pixels belonging to each scale representing a corresponding intensity of the quantified luminance or chromatic signal is obtained for each rectangular element.

Herein, the feature pattern of the two-dimensional image obtained from the two-dimensional image is denoted by using a pixel number $h_{(x, y, z)}$ at a horizontal coordinate (x), a pixel number at a vertical coordinate (y) and a coordinate (z) representing an intensity of the quantified image signal within each said rectangular element.

The third means is a reduction in dimension of the feature patterns. The feature patterns are obtained by transforming the pixel number components $h_{(x, y, z)}$ of the three-dimensional matrix, which have been obtained from a two-dimensional image of an arbitrary object by using the first and the second means.

The pixel number components corresponding to a two-dimensional matrix consisting of a horizontal coordinate and a vertical coordinate are taken out from the pixel number components of the three-dimensional matrix with respect to each scale of the intensity of the quantified image signals, The pixel number components of the two-dimensional matrix are transformed by using a two-dimensional discrete cosine transform or a two-dimensional discrete sine transform, thereby obtaining frequency components in a two-dimensional space, and The feature pattern represented as a three-dimensional matrix (u, v, z) of frequency components, which have been extracted as low-frequency ones from the frequency components in the two-dimensional space such that a number of the components maximizes recognition precision, is used as a feature pattern of the two-dimensional image for the object in the three-dimensional space.

The fourth means is also a reduction in dimension of the feature pattern. The feature patterns are obtained by transforming the pixel number components $h_{(x, y, z)}$ of the three-dimensional matrix, which have been obtained from an two-dimensional image by using the first and the second means.

The pixel number components of the three-dimensional matrix are transformed by a three-dimensional discrete cosine transform or a three-dimensional discrete sine transform with respect to a horizontal coordinate, a vertical coordinate and a coordinate representing an intensity of the quantified image signal, thereby obtaining frequency components in a three-dimensional space, and The feature pattern represented as a three-dimensional matrix (u, v, w) of frequency components, which have been extracted as low-frequency ones from the frequency components in the three-dimensional space such that a number of the components maximizes recognition precision, is used as a feature input pattern of the two-dimensional image for the object The fifth means is feature pattern recognition based on relative distance. The feature pattern $h_{(p1, p2, p3)}$ is represented as the three-dimensional matrix of pixel number components or frequency components of the two-dimensional image, which have been obtained by the first and the second means, by the first and the second and the third means, or by the first and the second and the fourth means from an image database obtained by scanning an object in a three-dimensional space belonging to an arbitrary type of attribute.

The relative distance between the reference vector $\mu_{(p1, p2, p3)}$ and the feature pattern vector $h_{(p1, p2, p3)}$ is calculated by using the relative distance:

$$d(h_{(p1,p2,p3)}, \mu_{q(p1,p2,p3)}) = \sum_{p1=1}^{N_1} \sum_{p2=1}^{N_2} \sum_{p3=1}^{N_3} \left(\frac{\mu_{q(p1,p2,p3)} - h_{(p1,p2,p3)}}{\sigma_{q(p1,p2,p3)}}\right)^2 + \log(2\pi\sigma_{q(p1,p2,p3)})$$

(Where coordinate (p1, p2, p3) is identical to (x, y, z) for three-dimensional pixel number components, (u, v, z) for frequency components obtained by two-dimensional DCT or (u, v, w) for frequency components obtained by three-dimensional DCT.) The distance is equal to 2 times of the logarithm of the probability function $P(\mu_{q(p1, p2, p3)}, \sigma_{q(p1, p2, p3)})$ represented by a normal distribution.

$$-2logP(\mu_{q(p1, p2, p3)}, \sigma_{q(p1, p2, p3)})$$

The reference vector $\mu_{q(p1, p2, p3)}$ and the variance vector a $\sigma_{q(p1, p2, p3)}$ are obtained as an average and a variance in a distribution of pixel number components or frequency components for each element of each three-dimensional matrix from the database of two-dimensional images having the same attribute q of the object.

The feature pattern of the object in the three-dimensional space belonging to the arbitrary type of attribute is estimated by the relative distance to the reference vector obtained from a set of two-dimensional images of an object having Mq types of attributes. The feature pattern vector $h_{(p1, p2, p3)}$ is determined to belong to a type m* represented by a reference vector which has the minimum relative distance.

$$m^* = argmin \; d(h_{(p1,p2,p3)}, \mu_{m(p1,p2,p3)})(m=1 \ldots M_q).$$

The sixth means is a feature pattern recognition based on distance utilizing the neural network learning. The neural network consists of a set of neural recognition units. The number of the neural recognition units is the same as that of the attributes of the objects to be classified. The neural recognition unit has the same number of input terminals as the number of components of a three-dimensional matrix and a single output terminal. When feature pattern input vector obtained from the two-dimensional image of an arbitrary object is input, the neural recognition unit storing a reference vector representing the attribute of the object outputs the minimum output value.

The neural recognition unit stores the reference vector and the variance vector of the statistical distribution of the feature pattern of each component of the three-dimensional matrix as learning coefficients and estimates relative distance between the feature pattern of the three-dimensional matrix, which has been obtained from the two-dimensional image of an arbitrary object, and the reference vector.

The reference and variance vectors corresponding to the average and variance of the distribution of the pixel number components or the frequency components with respect to each element of the three-dimensional matrix is obtained by means of neural network learning.

The seventh means is an image recognition using a mixture model of prior distributions of feature pattern of pixel number components or frequency components of the three-dimensional matrix, which have been obtained by the first and the second means, by the first, the second and third means or by the first, the second and the fourth means from an image database obtained by scanning the object belonging to the same type of attribute.

To derive the most likelihood variance for the relative distance calculation, the mixture class is constructed by using a set of classes. For each class of feature patterns having an attribute of an object, feature patterns having the other attribute are included in the mixture class. The optimal number of classes included in the mixture classes is selected.

The component of the most likelihood variance vector is obtained from a mixture distribution of pixel number components or frequency components with respect to each element of the three-dimensional matrix by minimizing the measure value of an amount of mutual information between a component of the variance vector and a component of another variance vector having a different attribute from that of the former variance vector.

The measure value is defined by using the logarithm value of the variance in feature pattern input vectors, which have been obtained from the two-dimensional images of an arbitrary object, and the logarithm value of the variance in feature patterns distribution which have been obtained from the two-dimensional images of a different object from the object.

The eighth means is production of feature pattern vectors for training a neural network to obtain the reference vector and the variance vector, respectively corresponding to the average and the variance of the distribution of pixel number components or frequency components of each element of the three-dimensional matrix.

For feature pattern input vectors of an arbitrary object, the feature pattern vector of a different object having the minimal distance defined by the fifth means to the former feature pattern vector is selected. The feature input pattern, obtained by mixing these feature input patterns with each other, is input to the neural network and the mixing ratio is varied in accordance with a number of times of learning.

The ninth means is determination of the attribute of the object feature patterns, which have been transmitted through a hardwired or wireless medium, by using the fifth means at a remote site.

The determination of the attribute of object feature patterns is performed at a remote site by receiving feature patterns being represented as the three-dimensional matrix of pixel number components or frequency components of the two-dimensional image, which have been obtained by the first and the second means, by the first, the second and the third means, or by the first, the second and fourth means from a set of several two-dimensional image data or from an image database obtained by scanning an object in a three-dimensional space belonging to an arbitrary type of attribute.

The reference pattern vector and the variance pattern vector obtained from an average and a variance in a distribution of feature components for each element of each three-dimensional matrix are stored by a receiver site of a hardwired network or a wireless network.

The feature input pattern of the two-dimensional image, which is represented by the pixel number components or the frequency components of the three-dimensional matrix obtained by the first and the second means, by the first, the second and third means, or by the first, the second and the fourth means is encoded and encrypted by a transmitter site.

The transmitted feature input pattern of the two-dimensional image is decrypted and decoded by the receiver site and determines the attribute of the object represented by the feature pattern of the two-dimensional image by using the neural network.

The tenth means is construction of the object image database of which image is used by the first and the second means. The object image database consists of a set of two-dimensional images, which have been obtained by rotating the object in the three-dimensional space several times, each time by a predetermined angle, and by scanning the object every time.

The present invention can solve the above-described problems through these means, thereby attaining the following functions or effects.

First, the neural network used in the image recognition method of the present invention can advantageously extract an invariant feature pattern, even if any variation is caused in rotation, position and illumination of the object. According to the present invention, since a feature pattern which is invariant with respect to a variation in illumination is used through a quantization using a histogram, a high precision recognition which is highly resistible to a variation in external illumination is realized. In addition, in the feature pattern space of the present invention, a variation in intensity of the image signals of a three-dimensional object can be stored separately with no interference in a quantified luminance space. Thus, the statistical variation in feature patterns of an image can be effectively optimized.

DESCRIPTION OF TIE PREFERRED EMBODIMENT

Example 1

Figure 1:
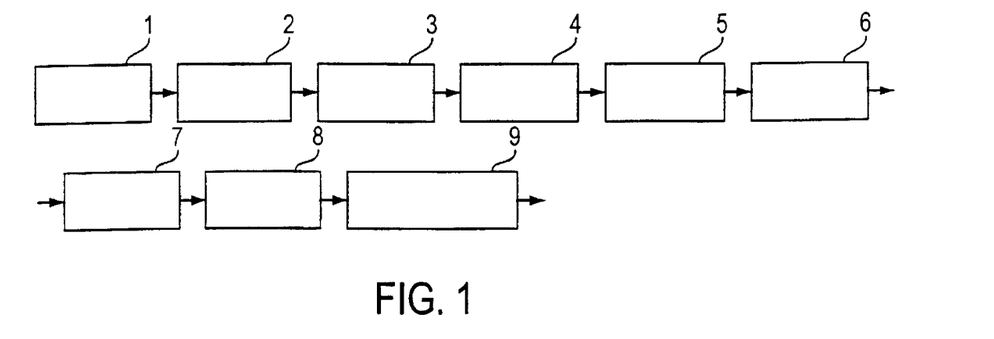
FIG. 1 is a chart of embodiment of an object recognition used in image communication.

A flow chart of the preferred embodiment of a method according to the invention is shown in FIG. 1. FIG. 1 shows an example of object recognition method used for image communication.

(1) Original image is captured by CCD(Charge Coupled Devices) camera.

(2) Scale of luminance or chromatic signal of original image is transformed into quantified scale by nonlinear look-up table.

(3) The quantified image is divided into several rectangular elements. Sampling unit calculates number of pixels per quantified scale in each rectangular element.

(4) Number of pixels represented by three-dimensional matrix structure, obtained by sampling in step 3, is transformed by three-dimensional or two-dimensional DCT (discrete cosine transformation) according to a plurality of exemplary embodiments. Low frequency components of DCT coefficients are selected and used as three dimensional feature patterns for object recognition.

(5) Three dimensional feature patterns extracted from low frequency components of DCT coefficients are encoded and decrypted for the transmission via wire or wireless channels.

(6) At receiver site, transmitted three dimensional feature patterns are decoded and decrypted as low frequency components of DCT coefficients.

(7) The decoded low frequency components of DCT coefficients are input to neural network for object classification.

The transmitter has a function of feature extraction and compression, which enables remote object recognition at receiver site without transmitting original image. DCT transform used in this patent has a compatibility with JPEG and MPEG image compression algorithm.

Example 2

The main procedure of feature detection and classification to recognize an object is embodied in this example using an image database which consists of Mq objects with Np different expressions. (For example Mq=40 and Np=10)

(M1) Quantization of luminance or chromatic signal of all the pixels of two dimensional image by nonlinear transformation.

(M2) Object feature representation by using a three-dimensional memory structure obtained from block subdivision and sampling.

(M3) DCT transformation of three-dimensional feature patterns.

(M4) Classification of feature patterns by using distance measures invented this patent.

In step M1, luminance or chromatic scale j is transformed by using normalized integral histogram function g(j).

$$g(j) = 255 \frac{G(j)}{G(255)}, \quad \text{[Equation1]}$$

where $$G(j) = \sum_{i=1}^{i=j} f(i).$$

($f_q$ is histogram function for 256 scales. Signal j with 256 scales is transformed to quantified signal y with $N_2$ ones.

$$y = \frac{N_z - 1}{255} g(j). \quad \text{[Equation2]}$$

Figure 2A:
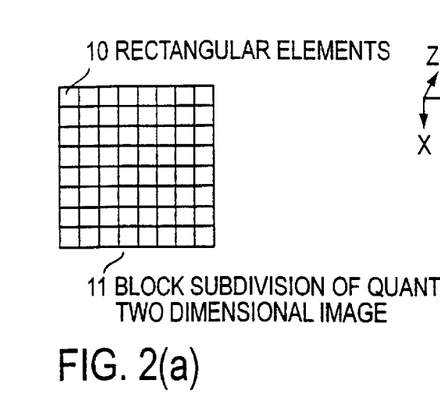
FIGS. 2(a) and 2(b) illustrate feature detection by means of block subdivision and sampling of two dimensional image in accordance with the present invention.
Figure 2B:
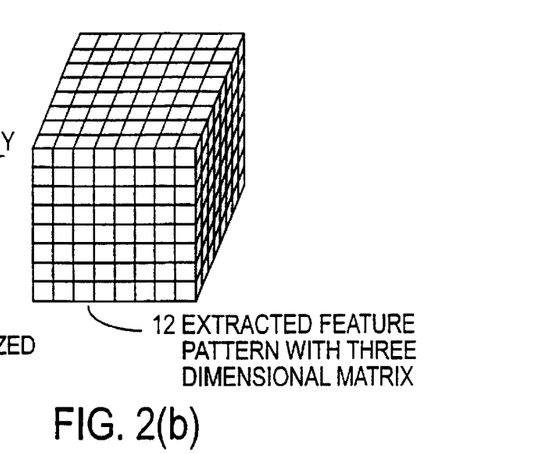

FIGS. 2(a) and 2(b) show an example of object feature representation by using a three-dimensional memory structure 12 obtained from block subdivision and sampling. In step M2, as illustrated in FIG. 2(a), two-dimensional quantified image 11 is subdivided into rectangular element 10, which consist of $N_x \times N_y$ rectangular elements. In each rectangular element, the number of pixels whose luminance or chromatic signal belongs to each scale is calculated. Then, as illustrated in FIG. 2(b) the histogram density at each rectangular element is represented by three dimensional matrix $h_{p(x,y,z)}$. (Where x and y denote horizontal and vertical locations of rectangular element. z denotes quantified scale of chromatic or luminance intensity.) In the case that a quantified image with $N_z$ scales is divided into an image of $N_x \times N_y$ rectangular elements, the histogram density is represented by $N_x \times N_y \times N_z$ matrix. For dimension reduction, histogram density is transformed by two or three dimensional DCT in step M3. By applying two dimensional DCT, we obtain $$h^{2dct}_{p(u,v,z)} = \quad \text{[Equation3]}$$
$$\sum_{x=0}^{Nx-1} \sum_{y=0}^{Ny-1} c(u)c(v) h_{p(x,y,z)} \cos\frac{\pi(2x+1)u}{2Nx} \cos\frac{\pi(2y+1)v}{2Ny}.$$

Where $c(u) = \frac{1}{2}\sqrt{2}$ ($u \neq 0$) and $c(u) = \frac{1}{2}$ ($u=0$). And u=0 to $N_x-1$, v=0 to $N_y-1$ and z=0 to $N_z-1$. The $h^{2dct}_{p(u,v,z)}$ is the discrete cosine transform of $h_{(x,y,z)}$. Low frequency components $h^{2dtp}_{(u,v,z)}$ derived from $N_x \times N_y$ DCT coefficients are used as feature pattern for pattern classification. For examples, u=0 to $N_{dctx}-1$, v=0 to $N_{dcty}$ 1, and z=0 to $N_z-1$, $N_{dctx} \times N_{dcty} \times N_z$ DCT coefficients are derived. Optimal numbers $N_{dctx}$ and $N_{dcty}$ are selected so as to maximize recognition performance by using methods explained in example 4.

In step M4, feature patterns are classified by using a decision function, which is obtained from a negative log-likelihood representation of normal distribution $P(h_{(u,v,z)}|\mu_q (u,v,z), \sigma_{q(u,v,z)})$.

$$d(h^{2dct}_{(u,v,z)}, \mu^{2dct}_{q(u,v,z)}) = \quad \text{[Equation4]}$$
$$\sum_{u=0}^{N_{2dctu}-1} \sum_{v=0}^{N_{2dctv}-1} \sum_{z=0}^{N_z-1} \left(\frac{\mu_{q(u,v,z)} - h_{(u,v,z)}}{\sigma_{q(u,v,z)}}\right)^2 + \log(2\pi|\sigma_{q(u,v,z)}|)$$

Where $\mu^{2dct}_{q(u,v,z)}$ and $\sigma^{2dct}_{q(u,v,z)}$ denote components of reference and variance vectors derived form averages and variances of the classes assuming normal distributions.

$$\mu^{2dct}_{q(u,v,z)} = \sum_{p=1}^{Np} \frac{h^{2dct(p)}_{q(u,v,z)}}{N_p}. \quad \text{[Equation5]}$$

$$(\sigma^{2dct}_{q(u,v,z)})^2 = \sum_{p=1}^{Np} \frac{\left(h^{2dct(p)}_{q(u,v,z)} - \mu^{2dct}_{q(u,v,z)}\right)^2}{N_p}. \quad \text{[Equation6]}$$

($N_p$ is number of training samples and p denotes.) To classify $M_q$ objects, this invention constructs a set of $M_q$ decision functions and identifies the most appropriate class m*, for an arbitrary input vector $h^{2dct}_{(u,v,w)}$ as the class for which the decision function has the minimal value.

$$m^* = \text{argmin} \ d(h^{2dct}_{(u,v,z)}, \mu^{2dct}_{P(u,v,z)}).$$ [Equation7]

In place of equation3, three dimensional DCT is used for dimension reduction of histogram density $h_{p(x,y,z)}$.

$$h^{3dct}_{p(u,v,w)} = \sum_{x=0}^{Nx-1}\sum_{y=0}^{Ny-1}\sum_{z=0}^{Nz-1} c_{(u)}c_{(v)}c_{(w)} h_{p(x,y,z)} \cos\frac{\pi(2x+1)u}{2Nx} \cos\frac{\pi(2y+1)v}{2Ny} \cos\frac{\pi(2x+1)w}{2Nz}.$$

Where $c(u) = \frac{1}{2}\sqrt{2}$ ($u \neq 0$) and $c(u) = \frac{1}{2}$ ($u = 0$).

Example 3

Figure 3:
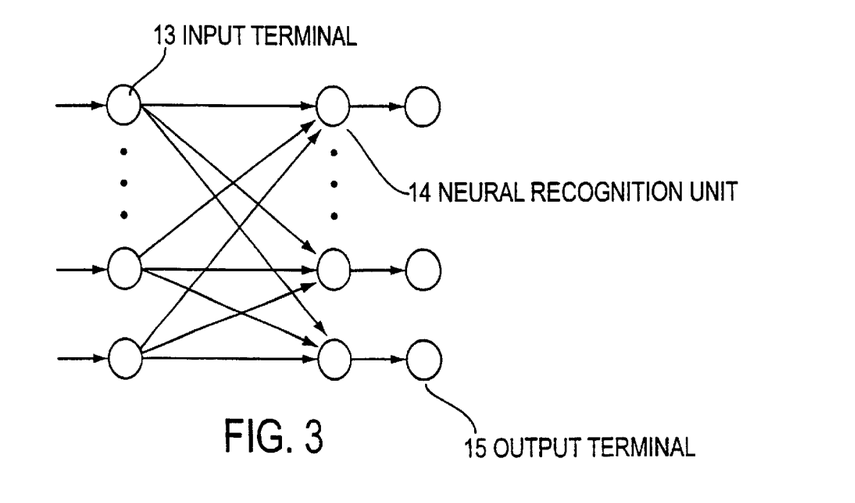
FIG. 3 is a structure of neural network designed for image recognition in accordance with the present invention.

FIG. 3 illustrates a structure of neural network designed for image recognition in accordance with the present invention. The neural network consists of a set of neural recognition units 14. The neural recognition unit has the same number of input terminals 13 as the number of components of a three-dimensional matrix and a single output terminal 14.

The number of neural recognition units is the same as that of the attributes of the objects to be classified. To classify $M_q$ objects, a neuron network is constructed by using a set of $M_q$ neural recognition units, each of which implements decision function defined by equation(4).

A feature pattern input vector is input from the two-dimensional image of an arbitrary object, one of the neural recognition units storing a reference vector representing the attribute of the object, outputs the minimum output value.

This neural network determines the most appropriate class m* by identifying the minimal value of neuron decision functions for an input feature pattern vector.

Figure 4:
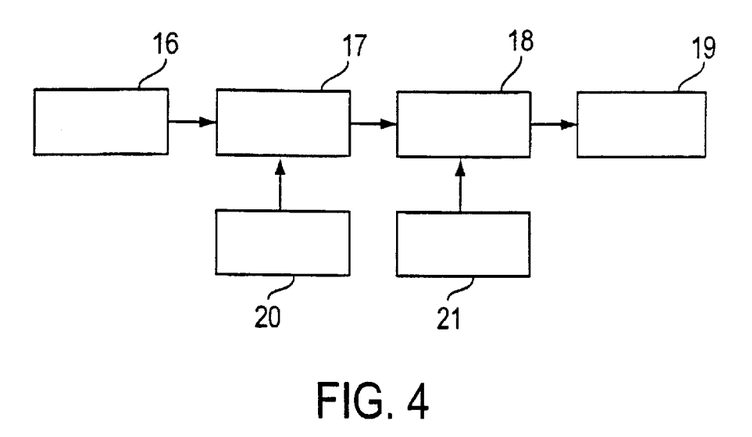
FIG. 4 is a flow diagram of a hardware implementation of a neural recognition unit in accordance with the present invention.

FIG. 4 illustrates a logic flow diagram of an exemplary hardware implementation of a neural recognition unit in accordance with the present invention. A neural recognition unit stores a reference vector and a variance vector derived from a normal distribution of feature input pattern vectors in memory registers 20 and 21. Then it determines relative distance between a reference vector and a input feature pattern vector of the three-dimensional matrix, which is input into input register 16.

The difference between each component of an input feature pattern vector and that of a reference pattern vector is calculated by using subtracting arithmetic unit 17. By using multiplier 18, difference of each component is weighted by an inverse value of each component of a variance vector and square of the weighted difference of each component is obtained. By adding up the components of the square of the weighted difference, accumulator 19 obtains relative distance between an input vector of feature pattern obtained from a two-dimensional image of an arbitrary object and a reference vector.

A reference vector and a variance vector corresponding to an average and a variance of distribution of the pixel number components or the frequency components with respect to each element of the three-dimensional matrix is obtained by means of neural network learning.

Here, we present an example of training method of a neural network using two dimensional DCT. For each presentation of an input vector $h^{2dct}_{p(u,v,z)}$ of a class p, we estimate relative distance and update each component of a reference vector with the minimal value in the following manner. When an input vector of feature pattern belongs to class k(p=k),

[Equation8]

$$\mu^{(t+1)}_{k(u,v,z)} = \mu^{(t)}_{k(u,v,z)} + \beta_1(h^{(t)}_{p(u,v,z)} - \mu^{(t)}_{k(u,v,z)}).$$ [Equation9]

When an input vector does not belong to class $l(p \neq 1)$, $$\mu^{(t+1)}_{l(u,v,z)} = \mu^{(t)}_{l(u,v,z)} + \beta_2(h^{(t)}_{p(u,v,z)} - \mu^{(t)}_{l(u,v,z)}).$$ [Equation10]

$(\mu^{(t)}_{k(u,v,z)}$ and $\mu^{(t)}_{l(u,v,z)}$ denote components of reference vectors of class k and l at learning iteration time t. $\beta_1$ and $\beta_2$ are modification factors.

$$\sigma^{(t+1)}_{k(u,v,z)} = (1 + \zeta(|h^{(t)}_{p(u,v,z)} - \mu^{(t)}_{k(u,v,z)}| - \sigma^{(t)}_{k(u,v,z)}))\sigma^{(t)}_{k(u,v,z)}.$$ [Equation11]

$$\sigma^{(t+1)}_{l(u,v,z)} = (1 - \zeta(\sigma^{(t)}_{l(u,v,z)} - |h^{(t)}_{p(u,v,z)} - \mu^{(t)}_{l(u,v,z)}|))\sigma^{(t)}_{k(u,v,z)}.$$ [Equation12]

$(\sigma^{(t)}_{k(u,v,z)}$ and $\sigma^{(t)}_{l(u,v,z)}$ denote components of variance vectors of class k and l at learning iteration time t. $\zeta(\lambda)$ is a modification function:

[Equation13]
$\lambda > 0 \ \zeta(\lambda) = 0$.
[Equation14]
$\lambda \leq 0 \ \zeta(\lambda) = 0$.

Initial values of reference and variance vectors for an arbitrary class p are derived form an average and a variance assuming a normal distribution of each component of DCT coefficients.

$$\mu^{(0)}_{p(u,v,z)} = \sum_{p=1}^{Np} \frac{h^{2dct}_{p(u,v,z)}}{N_p}.$$ [Equation15]

$$\sigma^{(0)}_{p(u,v,z)} = \sum_{p=1}^{Np} \frac{(h^{2dct}_{p(u,v,z)} - h^{(0)}_{p(u,v,z)})^2}{N_p}$$ [Equation16]

Example 4

The present invention provides means to select optimal number of coefficients in the DCT representation of an object feature. In this example, $h^{2dct}_{l(u,v,z)}$ obtained by DCT transform of block histogram density $h_{p(x,y,z)}$ described in step M3 of example 2.

$$\varepsilon = \sum_{x=0}^{Nx-1}\sum_{y=0}^{Ny-1}\sum_{z=0}^{Nz-1}(\varepsilon_{p(x,y,z)})^2/N_xN_yN_z. \quad \text{[Equation17]}$$

$$\varepsilon_{p(x,y,z)} = h_{p(x,y,z)} - \sum_{u=0}^{Ndct-1}\sum_{v=0}^{Ndct-1} c_{(u)}c_{(v)}h^{2dct}_{p(u,v,z)}\cos\frac{\pi(2x+1)u}{2N}\cos\frac{\pi(2y+1)v}{2N}.$$

Figure 5:
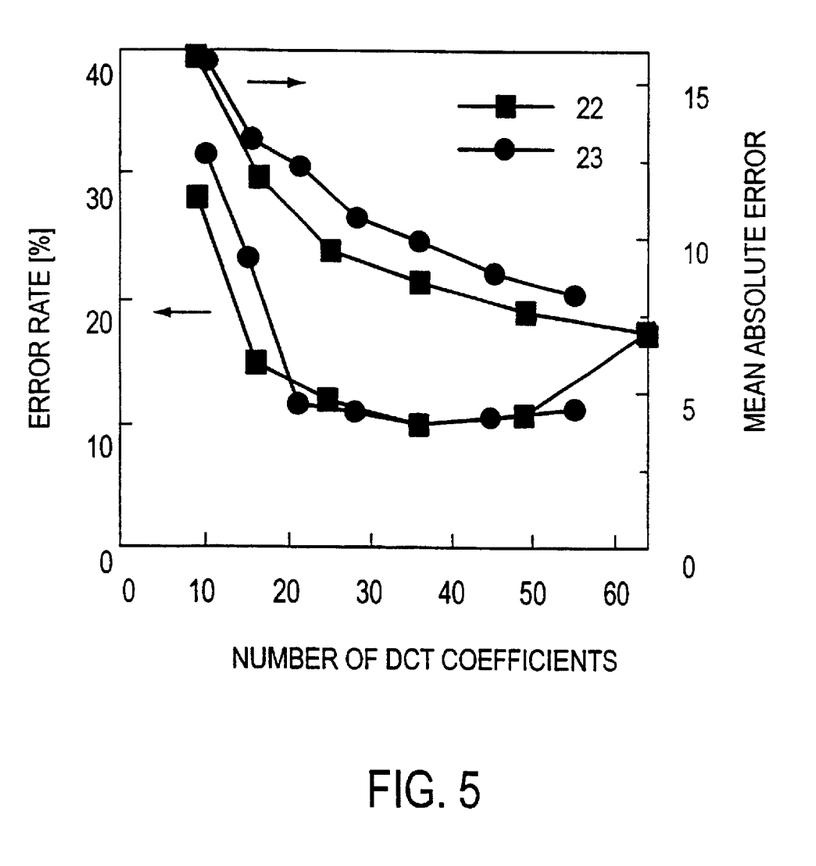
FIG. 5 is a graphical representation of the relationships between the numbers of coefficients and the recognition error rate and mean absolute error for the coefficients in accordance with the present invention.

FIG. 5 shows relation of number of DCT coefficients to recognition error rate and mean absolute error for the coefficients $h^{(a)2dct}_{(u,v,z)}$ and $h^{(b)2dct}_{(u,v,z)}$, which are specified by lines 22 and 23 respectively.

$$\{h^{(a)2dct}_{(u,v,z)}|0\leq u,v\leq N^a_{dct}\} \quad \text{[Equation18]}$$

$$\{h^{(b)2dct}_{(u,v,z)}|0\leq u+v\leq N^b_{dct}\}. \quad \text{[Equation19]}$$

There is the trade-off between error rate and complexity in the DCT approximation. Increasing the coefficient number reduces the approximation error but increases the complexity of the learning network. The recognition error rates reach the minimum value at around 36 coefficients($N^a_{dct}=5$. $N^a_{dct}=7$.) According to the present invention, the number of DCT coefficients is selected so as to minimize error rate determined as a trade-off between the model complexity and mean absolute error.

Example 5

An exemplary embodiment of the neural network of the present invention is trained by using 400 images from an ORL(Olivetti Research Laboratory) database consisting of 40 persons with 10 distinct poses. 5 poses are used for training and the rest 5 for testing. An input image of 114×88 pixels is divided into 8×8×8 rectangular blocks.

Figure 6:
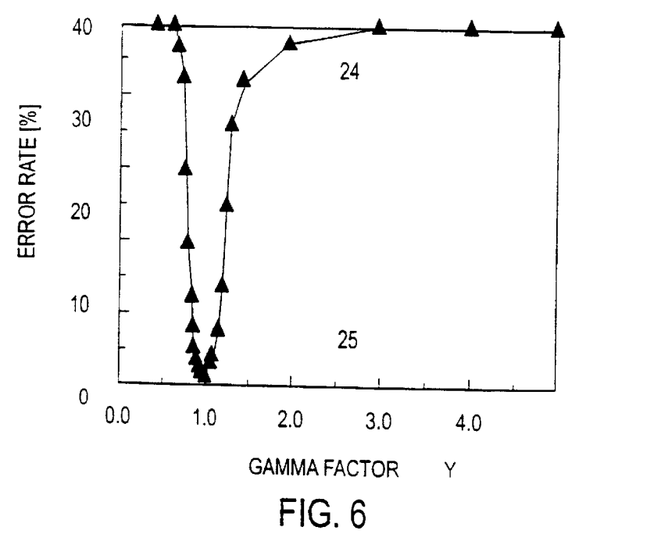
FIG. 6 illustrates is a graphical representation illustrating the difference of the learning performance between a non-linear table with and without histogram equalization.

FIG. 6 illustrates the difference of the learning performance between nonlinear table with and without histogram equalization. Test images for estimating luminance variation characteristics are generated by using gamma transformation $G(y)=255*(y/255)^{(1/\gamma)}$. At gamma factor $\gamma=1$, the error rate obtained by quantization without histogram equalization is lower than that of the present invention. However, the error rate is significantly increased with luminance variation. The error rate exceeds 0.1 in the ranges of $\gamma\leq 0.925$, $\gamma\geq 1.2$. The error rate obtained by the quantization method with histogram equalization, on the other hand, has maintained a relatively low error rate between 0.04~0.09 for the range of $\gamma=0.4$~3.0.

To account for the effectiveness of invented image synthesis method, results of face recognition performance base on two or three dimensional DCT with image synthesis are compared with those of other known methods on the same data. The dimension of block histogram inputs is reduced from 8×8×8 to 4×4×8 or 4×4×4 by 2 DCT or 3 DCT. Training examples have been obtained by image synthesis to construct a neural network for face classification according to this invention. The images are obtained from image synthesis using two different facial image of person A and B with mixing ratios of 1/6, 3/1, 3/2, 2/3, 1/3 and 6/1. These two images are specified by q and m(q). The image specified by m(q) is selected from facial image database to have the minimal distance of reference pattern defined by equation 4 with regard to that by an arbitrary image q.

$$d(\mu_{q(u,v,z)}, \mu_{m(q)(u,v,z)}) = \quad \text{[Equation21]}$$
$$\sum_{u=0}^{Ndct-1}\sum_{v=0}^{Ndct-1}\sum_{z=0}^{Nz-1}\left(\frac{\mu_{q(u,v,z)}-\mu_{m(q)(u,v,z)}}{\sigma_{q(u,v,z)}}\right)^2 + \log(2\pi|\sigma_{q(u,v,z)}|).$$

$$m(q)=\arg\min d(\mu_{q(u,v,z)},\mu_{m(q)(u,v,z)}). \quad \text{[Equation22]}$$

$$\bar{h}_{q(u,v,z)}=(1-\alpha)h_{q(u,v,z)}+\alpha h_{m(q)(u,v,z)}. \quad \text{[Equation23]}$$

The mixing ratio is decreased with a decay constant $\eta$, when the learning proceeds.

$$\alpha = \alpha_0 * \exp\left(\frac{-t}{\eta}\right) \quad \text{[Equation24]}$$

Figures 7, 8:
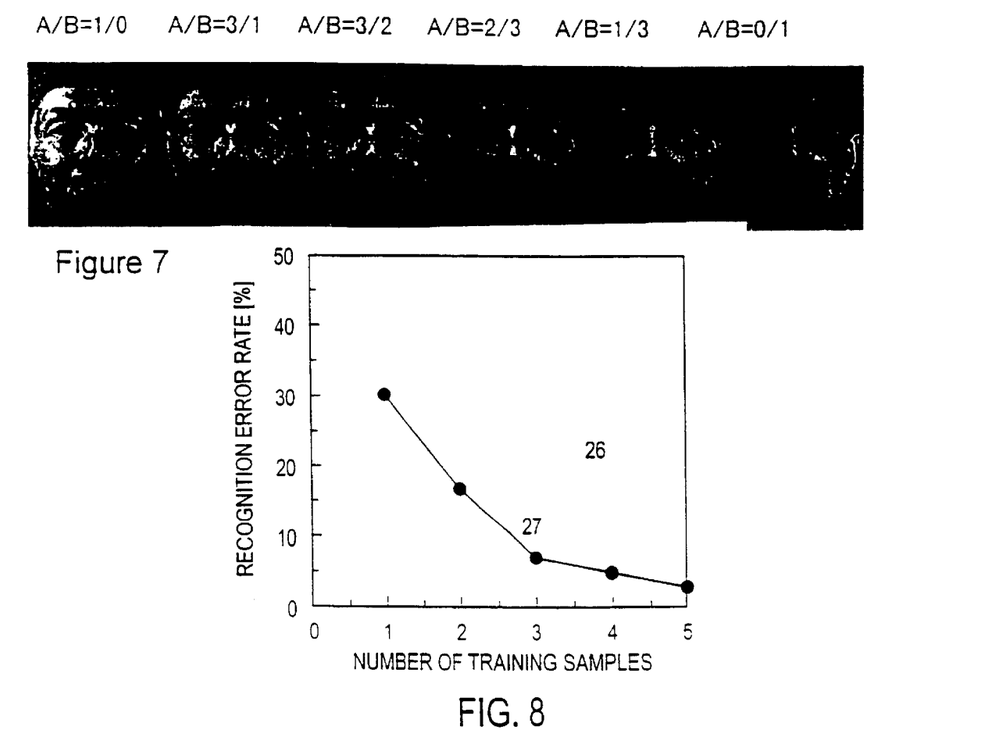
FIG. 7 is image synthesis for training neural network.
FIG. 8 is a graphical representation illustrating the recognition performance using training image samples obtained by image synthesis in accordance with the present invention.

The recognition performance is obtained from face recognition using an ORL database consisting of 400 facial images with 10 different expressions for 40 persons with distinct variations such as open/close eyes, smiling/non-smiling faces, glasses/non-glasses poses, and rotation up to 20 degrees. FIG. 8 shows error rate dependence on the number of training samples, ranging from 1 to 5 images for each person. The remaining images from 9 to 5 are used for testing performance of an image recognition system. The result specified by 27 is obtained from two dimensional DCT with image synthesis using images m and m(q) described above. The decay factor is 200. The result specified by 26 is obtained from two dimensional DCT without image synthesis. With 5 learning samples, the error rate of 2 DCT combined with image synthesis ($\alpha_0=0.5$) is 2.4%, which is much lower than 13.6%, obtained from using 2 DCT without image synthesis($\alpha_0=0.0$). The error rate of 2 DCT is therefore improved by approximately six times by using the present invention's image synthesis. This result accounts for effectiveness of present invention's face recognition based on two dimensional DCT with image synthesis.

Figure 13:
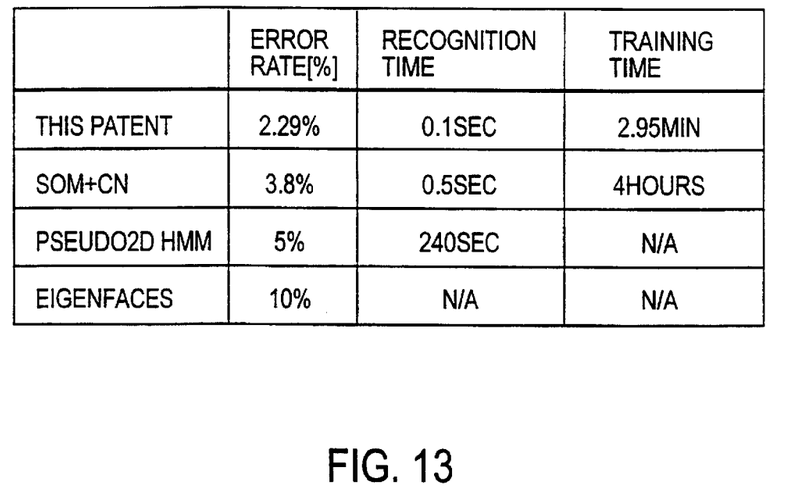
FIG. 13 is a table showing system performance obtained by barious methods.

FIG. 13 shows system performance obtained by various methods. The results of SOM(Self-organizing Map)+CN (Convolution Network), Pseudo two dimensional HMM (Hidden Marcov Model) and Eigenface model are excerpted from Face Recognition: A Hybrid Neural Network Approach, (S. Lawrence et al, Technical Report CS-TR-3608, University of Maryland. 1996). An error rate of 2.29% using our method is achieved, which is better than the 3.8%, 5.3%, 5% and 10.5% obtained using SOM+CN, KLT convolution network, Pseudo 2 D hidden Markov model and eigenface model, respectively.

Example 6

Equation 4 presents a decision function using a reference vector and variance vector, which are derived by assuming a proper distribution of input feature patterns, to estimate relative distance between input feature pattern and reference pattern representing object features. The assumption of feature pattern distribution is crucial for the performance of an image recognition when number of samples is very small.

Figure 9A:
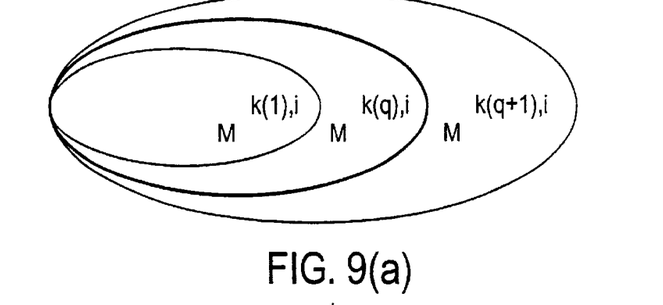
FIGS. 9(a) and 9(b) are schematic structure of mixture classes obtained by a likelihood function of number of the mixture
Figure 9B:
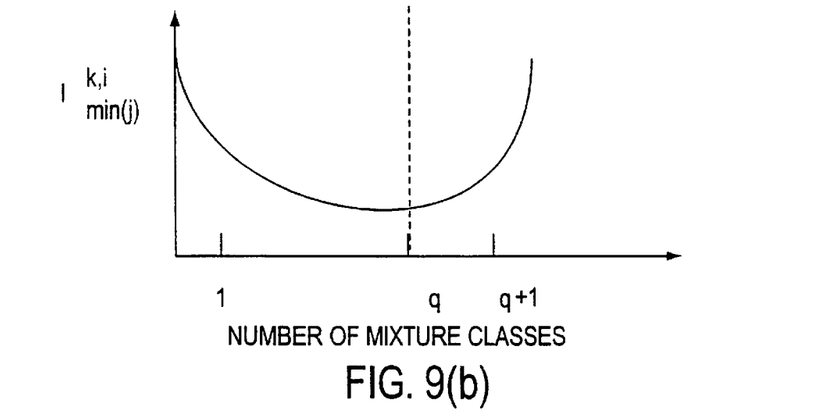

For an image recognition using a small set of samples, the present invention utilizes a mixture model of local prior distributions which assigns a variable number of the mixture classes to each class and then determines the mixture number and the local metric parameters so as to minimize the cross entropy between the real distribution and the modeled distribution. FIG. 9 is a schematic structure of mixture classes defined by a likelihood function $l^{k(u,v,z)}{}_{min}$ of a number. A mixture class $M^{k(m)(u,v,z)}$ is constructed from a set of classes k(0),k(1), . . . ,k(m−1) and k(m).(where k(0)=k.)
$M^{k(1)(u,v,z)} \in M^{k(2)(u,v,z)} \ldots, M^{k(m)(u,v,z)}$.

The m-th mixture class k(m) is assigned according to each reference class k based on the likelihood measure $l^{k(m)(u,v,z)}$min:

$$l^{k(m)(u,v,z)}_{min} = \sum_{j=0}^{m} \log \sigma_{k(j)(u,v,z)}.$$

For each class, the minimal size of the mixture model is uniquely derived from the minimization of the likelihood function.

$$l^{k(0)(u,v,z)}_{min} \geq l^{k(1)(u,v,z)}_{min} \cdots \geq l^{k(m)(u,v,z)}_{min} \text{ and } l^{k(m)(u,v,z)}_{min} < l^{k(m+1)(u,v,z)}_{min}. \quad [\text{Equation 26}]$$

Then, an optimal variance is obtained by $$(\sigma^{opt}_{k(u,v,z)})^2 = \frac{\sum_{j=0}^{j=m}(\sigma_{k(j)(u,v,z)})^2}{m+1}. \quad [\text{Equation 27}]$$

Figure 10:
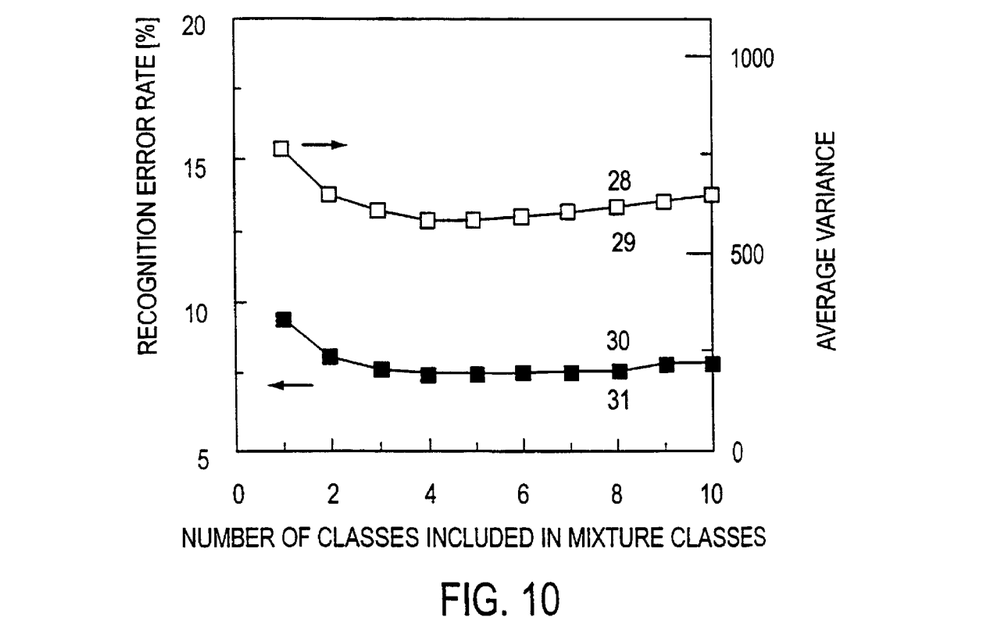
FIG. 10 is a graphical representation illustrating the relation of average variance and error rate to the number of mixture classes in accordance with the present invention.

FIG. 10 shows the relation of average variance and error rate to the number of mixture classes. The performances, using a system or method in accordance with the present invention are, specified by 29 and 31, are compared with results derived from a fixed size of mixture classes for all the components specified by 28 and 30. The minimal error rates of 7.65% and 8.24% or the variances of 618 and 960 are obtained at the size of 3 and 4. Using a system or method in accordance with the present invention, the error rate and average variance are decreased and saturated to 6.28% and 516 with an increase in the number of mixture classes. The essence of the present invention allows variable size of the mixture classes. The error rate with variable size of mixture classes is significantly improved from 7.78% to 6.28% by allowing an optimal size of mixture classes defined by the entropy distance.

Example 7

Figure 11A:
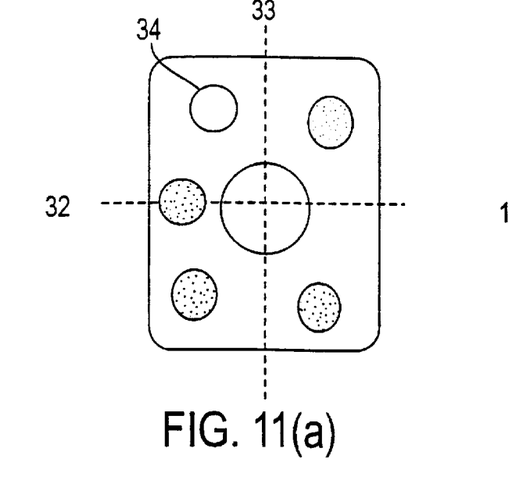
FIGS. 11(a) and 11(b) are illustration of training image generation realizing rotational invariant recognition.
Figure 11B:
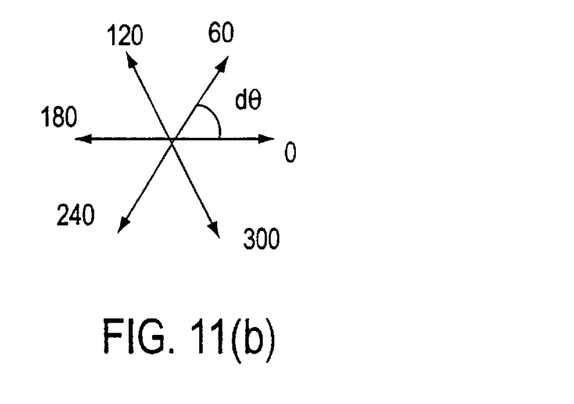

A neural network for recognizing rotation-invariant object features is constructed according to this patent by presenting several images of rotating objects to a neural network. FIGS. 11(a) and 11(b) illustrates an example of generating luminance images from a rotating object. As illustrated in FIG. 11(a), an object 34 is rotated at the intersecting point of two central lines 32 and 33 by angle θ=60*n degree(n=0~5) as illustrated in FIG. 11(b).

Luminance signals of all the pixels of the two-dimensional image, which have been obtained by scanning an rotating object in a three-dimensional space, are input into a nonlinear table and are transformed into quantified ones. The quantified two-dimensional image is divided into several rectangular elements, and the number of pixels belonging to each scale representing a corresponding intensity of the quantified luminance signal is obtained at each rectangular element.

Feature patterns with three dimensional matrix structure obtained from six rotated images per person are presented for training neural network. This method using three dimensional representation of a rotating object assigns feature patterns, obtained by sampling the different luminance signals at the same location of a rectangular element of an rotating object to different scales. This enables neural network to store feature patterns without interference among rotated images.

Figure 12:
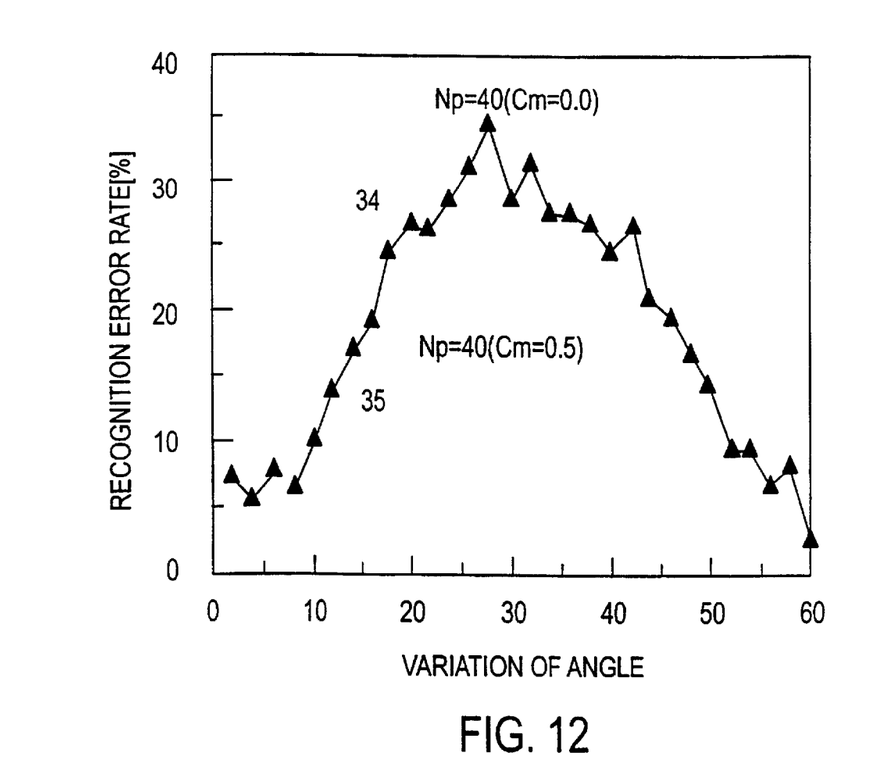
FIG. 12 is a graphical representation illustrating recognition performance of rotating objects with variation of angle range from 0 to 60 degrees.

FIG. 12 shows recognition performance of rotating objects with variation of angle range from 0 to 60 degrees. Input feature patterns obtained from rotating facial objects of 40 persons from 0, 60, 120, 180 and 240 degrees are used for constructing a neural network. This patent employs image synthesis using training samples. (Then, θ=0, 60, 120, 180, 240.) The test images are generated by changing angle by Δ θ=1 to 60 degrees. The rotating angle of test images is specified by θ=θ+Δθ. The recognition error rates of the present invention are less than that of conventional method without image synthesis. This example accounts for effectiveness of recognizing rotating objects in accordance with the present invention.

By superimposing six rotated images in luminance or chromatic signal space, each image represented by using luminance signals per rectangular element interfere with the other image.

What is claimed is:

1. An image recognition method comprising:
    a first step of obtaining quantified image signals by inputting luminance or chromatic signals of all the pixels of a two-dimensional image into a nonlinear table, the two-dimensional image having been obtained by scanning an object in a three-dimensional space; and
    a second step of dividing the two-dimensional image, obtained by the first step, into several rectangular elements and obtaining number of pixels belonging to each quantified scale of luminance or chromatic signal in each of the rectangular elements;
    wherein the nonlinear table is constructed such that, in histogram distribution of scales which has been obtained by quantizing the input image signals of all the pixels of the two-dimensional image, the histogram of the quantified pixels belonging to each of the scales is equalized;
    and wherein a feature pattern of the two-dimensional image obtained from the object in the three-dimensional space is represented by a three-dimensional matrix (x, y, z) by using a pixel number at a horizontal coordinate (x), a pixel number at a vertical coordinate (y) and a coordinate (z) representing an intensity of the quantified image signal within each said rectangular element obtained by performing the first and the second steps.

2. The image recognition method according to claim 1, wherein, instead of obtaining the feature pattern as the three-dimensional matrix (x, y, z), consisting of the pixel number components, from the two-dimensional image by performing the first and the second steps of claim 1 on the image signals of the two-dimensional image which has been obtained from the object in the three-dimensional space,
    pixel number components corresponding to a two-dimensional matrix consisting of a horizontal coordinate and a vertical coordinate are taken out from the pixel number components of the three-dimensional matrix with respect to each scale of the intensity of the quantified image signals,
    the pixel number components of the two-dimensional matrix are transformed by using a two-dimensional discrete cosine transform or a two-dimensional discrete sine transform, thereby obtaining frequency components in a two-dimensional space, and a feature pattern represented as a three-dimensional matrix (u, v, z) of frequency components, which have been extracted as low-frequency ones from the frequency components in the two-dimensional space such that a number of the components maximizes recognition precision, is used as a feature pattern of the two-dimensional image for the object in the three-dimensional space.

3. The image recognition method according to claim 1, wherein, instead of obtaining the feature pattern as the three-dimensional matrix (x, y, z), consisting of pixel number components, from the two-dimensional image by performing the first and the second steps of claim 1 on the image signals of the two-dimensional image which has been obtained from the object in the three-dimensional space, the pixel number components of the three-dimensional matrix are transformed by a three-dimensional discrete cosine transform or a three-dimensional discrete sine transform with respect to a horizontal coordinate, a vertical coordinate and a coordinate representing an intensity of the quantified image signal, thereby obtaining frequency components in a three-dimensional space, and a feature pattern represented as a three-dimensional matrix (u, v, w) of frequency components, which have been extracted as low-frequency ones from the frequency components in the three-dimensional space such that a number of the components maximizes recognition precision, is used as a feature input pattern of the two-dimensional image for the object in the three-dimensional space.

4. The image recognition method according to claim 1, wherein, in a set of feature patterns, each pattern being represented as the three-dimensional matrix of pixel number components or frequency components of the two-dimensional image, which have been obtained by the method of claim 1 from a set of several two-dimensional image data or from an image database obtained by scanning an object in a three-dimensional space belonging to an arbitrary type of attribute, a reference vector and a variance vector are obtained from an average and a variance in a distribution of pixel number components or frequency components for each element of each three-dimensional matrix;

the feature pattern of the object in the three-dimensional space belonging to the arbitrary type of attribute is represented by these vectors;

a relative distance between the feature pattern of the three-dimensional matrix, which has been obtained from the two-dimensional image of the object of the arbitrary attribute by the method of claim 1 with reference to the reference vector and the variance vector, and the reference vector is determined; and the attribute of the object is determined from an arbitrary two-dimensional image other than the image database.

5. The image recognition method according to claim 4, wherein, in each set of feature patterns having the same attribute of the object in the two-dimensional image database, the database being represented as an image feature pattern of pixel number components or frequency components of the three-dimensional matrix, which has been obtained by the method of claim 1, from a set of several two-dimensional images or the image database obtained from by the object of claim 4 in the three-dimensional space belonging to the arbitrary type of attribute, a variance vector is obtained for a distribution of pixel number components or frequency components with respect to each element of the three-dimensional matrix by means of a statistical calculation or neural network learning; and a reference vector corresponding to an average of the distribution of the pixel number components or the frequency components with respect to each element of the three-dimensional matrix of claim 4 is obtained by means of neural network learning;

the neural network storing the reference vector and the variance vector, which represent the objects having the same attribute of the image database of claim 4, as learning coefficients, determining a relative distance between the feature pattern of the three-dimensional matrix, which has been obtained from the two-dimensional image other than the image database by the method of claim 1, and the reference vector; and determining the attribute of the object from an arbitrary two-dimensional image other than the image database.

6. The image recognition method according to claim 4, in each set of feature patterns having the same attribute of the object in the two-dimensional image database, the database being represented as an image feature pattern of pixel number components or frequency components of the three-dimensional matrix, which has been obtained by the method of claim 1 from a set of several two-dimensional images or an image database obtained from by the object of claim 4 in the three-dimensional space belonging to the arbitrary type of attribute, a variance vector is obtained for a distribution of pixel number components or frequency components with respect to each element of the three-dimensional matrix; and a reference value of an amount of mutual information between a component of the variance vector and a component of another variance vector having a different attribute from that of the former variance vector is obtained instead of the variance vector of each said attribute; and the component of the variance vector of each said attribute is determined by using the components of several variance vectors having respective attributes different from the attribute so as to minimize the reference value of the amount of mutual information.

7. The image recognition method according to claim 5, wherein, in order to obtain the reference vector and the variance vector, respectively corresponding to the average and the variance of the distribution of pixel number components or frequency components of each said element of the three-dimensional matrix of claim 5, by making a neural network learn, for the distribution of pixel number components or frequency components of each said element of the three-dimensional matrix which has been obtained by the statistical calculation of claim 5, not the variance vectors, but a feature pattern, which is separated by a minimum relative distance from a feature pattern belonging to an object having an attribute in the feature pattern space of claim 5 and which has a different attribute from the attribute, is obtained from the feature patterns having the attributes which are represented by the pixel number components or the frequency components of the three-dimensional matrix, obtained by the method of claim 1, for the two-dimensional image in the image database of claim 5, a feature input pattern, obtained by mixing these feature input patterns with each other, is input to the neural network, and a mixing ratio thereof is varied in accordance with a number of times of learning.

8. The image recognition method according to claim 5, wherein in a set of feature patterns, each pattern being represented as the three-dimensional matrix of pixel number components or frequency components of the two-dimensional image, which have been obtained by the method of claim 1 from a set of several two-dimensional image data or from an image database obtained by scanning an object in a three-dimensional space belonging to an arbitrary type of attribute, a reference pattern vector and a variance pattern vector obtained from an average and a variance in a distribution of feature components for each element of each said three-dimensional matrix are stored by a receiver site of a hardwired network or a wireless network, the feature input pattern of the two-dimensional image, which is represented by the pixel number components or the frequency components of the three-dimensional matrix obtained by the method of claim 1, is encrypted and encoded by a transmitter site, and the transmitted feature input pattern of the two-dimensional image is decoded and decrypted by the receiver site, thereby determining the attribute of the object represented by the feature pattern of the two-dimensional image by using the neural network of claim 5.

9. The image recognition method according to one of claims 1, wherein a set of two-dimensional images, which have been obtained by rotating the object in the three-dimensional space several times, each time by a predetermined angle, and by scanning the object every time, is used instead of the set of two-dimensional images or the image database which has been obtained by scanning the object in the three-dimensional space belonging to the attribute of the arbitrary type as described in claim 1, thereby using the feature pattern of pixel number components or frequency components of the three-dimensional matrix of claim 1.

* * * * *